US006778827B1

(12) United States Patent
Anderson et al.

(10) Patent No.: US 6,778,827 B1
(45) Date of Patent: Aug. 17, 2004

(54) METHODS AND SYSTEMS FOR SCANNING AND LOCKING ONTO A CONTROL CHANNEL VIA A MULTI-LEVEL SEARCH IN A WIRELESS COMMUNICATIONS SYSTEM

(75) Inventors: Keith W. Anderson, Durham, NC (US); Wail M. Refai, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 499 days.

(21) Appl. No.: 09/656,673

(22) Filed: Sep. 7, 2000

(51) Int. Cl.[7] .................................................. H04Q 7/20

(52) U.S. Cl. .................... 455/434; 455/432.1; 455/433; 455/434; 455/435.1; 455/452.1

(58) Field of Search .......................... 455/432.1–435.1, 455/450–452.1, 552, 434, 421, 511

(56) References Cited

U.S. PATENT DOCUMENTS 5,794,157 A * 8/1998 Haartsen ..................... 455/522
5,809,419 A * 9/1998 Schellinger et al. ........ 455/434
5,903,839 A 5/1999 Mattila ....................... 455/434
5,950,130 A * 9/1999 Coursey .................. 455/432.1
5,953,665 A * 9/1999 Mattila ....................... 455/434
6,011,960 A 1/2000 Yamada et al. ............... 455/77
6,026,300 A * 2/2000 Hicks ......................... 455/434
6,108,541 A * 8/2000 Yazaki et al. ............... 455/434
6,148,198 A * 11/2000 Anderson et al. ........... 455/432
6,400,948 B1 * 6/2002 Hardin ........................ 455/434
6,421,328 B1 * 7/2002 Larribeau et al. ........... 455/434
6,453,172 B1 * 9/2002 Miyashita ................ 455/552.1
6,564,055 B1 * 5/2003 Hronek ....................... 455/433

FOREIGN PATENT DOCUMENTS

WO WO 99/41923 8/1999 ............ H04Q/7/32

OTHER PUBLICATIONS

*Digital Control Channel Layer 3*, TIA/EIA–136–A, Part 123, Sections 4.1–4.3, Aug. 31, 1999.
International Search Report for PCT/US01/26031 dated May 8, 2002.

* cited by examiner

*Primary Examiner*—William Trost
*Assistant Examiner*—Sharad Rampuria
(74) *Attorney, Agent, or Firm*—Myers, Bigel Sibley & Sajovec PA

(57) ABSTRACT

Methods and systems are provided for a wireless terminal to select a control channel from a plurality of channels provided on a plurality of respective operating frequencies in which a first group of the operating frequencies are first scanned to locate a control channel that satisfies a first set of selection criteria. During this scan, channels are identified that fail to satisfy the first set of selection criteria but that have an increased probability of satisfying a second set of selection criteria. If a channel that satisfies the first set of selection criteria is not located during the first scan, the wireless terminal determines an order in which a second group of operating frequencies are to be scanned based on the identified channels, and then scans the second group of operating frequencies in the determined order to locate a control channel that satisfies the second set of selection criteria.

27 Claims, 11 Drawing Sheets

Antenna System 46
Wireless Terminal 40
Receiver/ Transmitter 42
Controller 48
H/P List 62
F/N List 64
LAB 66
DHT 68
IRDB 70
Memory 60
Display 54
Keypad 52
Speaker 56
Microphone 50
User Interface 44

METHODS AND SYSTEMS FOR SCANNING AND LOCKING ONTO A CONTROL CHANNEL VIA A MULTI-LEVEL SEARCH IN A WIRELESS COMMUNICATIONS SYSTEM

BACKGROUND OF THE INVENTION

The present invention relates to wireless communications and, in particular, to methods and systems for scanning and locking onto a control channel in a wireless communications system.

In cellular telephone and other wireless communication systems, wireless terminals often need to "lock onto" or "camp on" a control channel when powering up and/or when transitioning between base stations. By "locking" or "camping" it is meant that the wireless terminal acquires synchronization with the control channel. In many situations, the wireless terminal will not know the location (operating frequency) of the best available control channel on which it could camp. Thus, the wireless terminal may have to locate such a control channel. This may be accomplished by "scanning" the operating frequencies corresponding to known channels in the communications system to locate a control channel which is considered acceptable. The process of scanning channels to locate such a control channel is sometimes referred to as an Intelligent Roaming ("IR") search or as a Power-Up Scan.

In many cellular telephone and other wireless communications systems, the wireless terminals may access communications channels operated by multiple service providers. For instance, in wireless communications systems operating under the North American TIA/EIA-136 cellular telephone standard, wireless terminals may access up to eight different frequency bands, each of which contain hundreds of separate channels. Typically, each of the eight frequency bands (and hence all the channels in that band) are operated by a different service provider. In many situations, wireless terminals may only be allowed to operate on a subset of the eight frequency bands, in that some of the bands are forbidden. Moreover, the cost to the wireless terminal (or to the wireless plan the terminal is using) may vary depending upon the frequency band used. In light of these variations in cost and availability, service providers are categorized under TIA/EIA-136 into five different groups—Home, Partner, Favored, Neutral and Forbidden service providers—which are listed in priority order from the most preferred to the least preferred. As a result, the goal of an IR search typically is not just to locate a control channel, but to locate and camp on a control channel of the highest priority service provider available. Wireless terminals operating under the TIA/EIA-136 standard include an Intelligent Roaming Database or "IRDB" which contains lists of Home, Partner, Favored and Forbidden service providers.

In many wireless communications systems, the IR search is performed as a series of separate scans of selected operating frequencies. For instance, the system standard for TIA/EIA-136 wireless communications systems specifies an IR Search that may include as many as four separate stages. In the first stage of the IR search, the wireless terminal scans a set of Private Operating Frequencies ("POF"). These private operating frequencies are the frequencies on which certain private or residential systems operate (at least in some geographic areas) to which the wireless terminal is allowed access. If a Digital Control Channel "DCCH" that is part of such a private or residential system having an acceptable receive signal strength ("RSS") level is identified in the POF scan, then the wireless terminal "locks onto" the channel by entering the DCCH camping state.

If a private or residential system DCCH is not found during the POF scan, the wireless terminal proceeds to the second stage of the IR search. In this stage, control channels listed in a Digital Control Channel History Table ("DHT") that is maintained in memory by the wireless terminal are scanned. The DHT contains a non-redundant listing as to the band and DCCH channel number of the control channels (excluding control channels on POF's) on which the wireless terminal has most recently camped. The DHT can contain multiple entries for a particular frequency band. The DHT is provided in TIA/EIA-136 compatible wireless terminals to speed-up the search for a control channel during an IR search, as, in many cases, an acceptable control channel corresponding to a highest priority service provider will be listed in the DHT. Under TIA/EIA-136, a control channel identified during the DHT scan is only considered acceptable for camping if it has at least the minimum receive signal strength and if it is a channel operated by either a Home or a Partner service provider.

If an acceptable control channel is not identified during the DHT scan, the IR search continues to its third stage, which is referred to as the wideband scan. The wideband scan is typically the most involved of the channel scans. During the wideband scan, each of the frequency bands specified in the IRDB is scanned, and the wireless terminal once again seeks to identify a DCCH operated by a Home or Partner service provider that has a minimum receive signal strength level. In lieu of scanning all of the hundreds of channels that are part of each frequency band, during the wideband scan each frequency band is typically divided into a number of "sub-bands" or "probability blocks", and the channels having the highest received signal strength in each sub-band/block are selected for scanning.

During the wideband scan, the wireless terminal will examine the first control channel scanned in each frequency band to determine if the frequency band is operated by a Home, Partner, Favored, Neutral or Forbidden service provider. If the frequency band is operated by a Favored, Neutral or Forbidden service provider, the scan of the band is typically aborted at that point, and the frequency band along with the highest received signal strength channels from each sub-band or probability block in a band operated by a Favored or Neutral service provider are added to a "Re-Scan List" that identifies the frequency bands that are scanned during the fourth and final stage of the IR search.

If an acceptable control channel is not identified during the wideband scan, the IR search proceeds to the fourth or re-scan stage. During this stage, the wireless terminal scans each of the frequency band-channel pairs included in the Re-Scan List. During the fourth stage of the IR search, if the wireless terminal identifies a control channel having at least the minimum received signal strength that is operated by a Favored or Neutral service provider, the wireless terminal attempts to enter the DCCH camping state on that channel.

SUMMARY OF THE INVENTION

In embodiments of the present invention, methods and systems are provided by which a wireless terminal may select a control channel from a plurality of channels. These methods and systems may be used by a wireless terminal to select a control channel on which it will camp, remain idle, or otherwise utilize. In particular embodiments of the present invention, a first set of operating frequencies are scanned to locate a control channel that satisfies a first set of selection criteria. During this scan, the wireless terminal also identifies channels that fail to satisfy the first set of selection criteria but that have an increased probability of satisfying a second set of selection criteria. If during the scan of the first set of operating frequencies a control channel is located that satisfies the first set of selection criteria, that control channel may be selected.

If a control channel is not selected, the wireless terminal may determine an order in which a second set of operating frequencies are to be scanned. This order may be based, at least in part, on the channels identified during the scan of the first set of operating frequencies as having an increased probability of satisfying the second set of selection criteria. The second subset of operating frequencies may then be scanned in the determined order to locate a control channel that satisfies the second set of selection criteria which, if located, may then be selected.

As will be appreciated by those of skill in the art, the present invention may be embodied as methods or systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or systems. Accordingly, the present invention may take the form of a hardware embodiment, a software embodiment or an embodiment combining software and hardware aspects.

Figure 1:
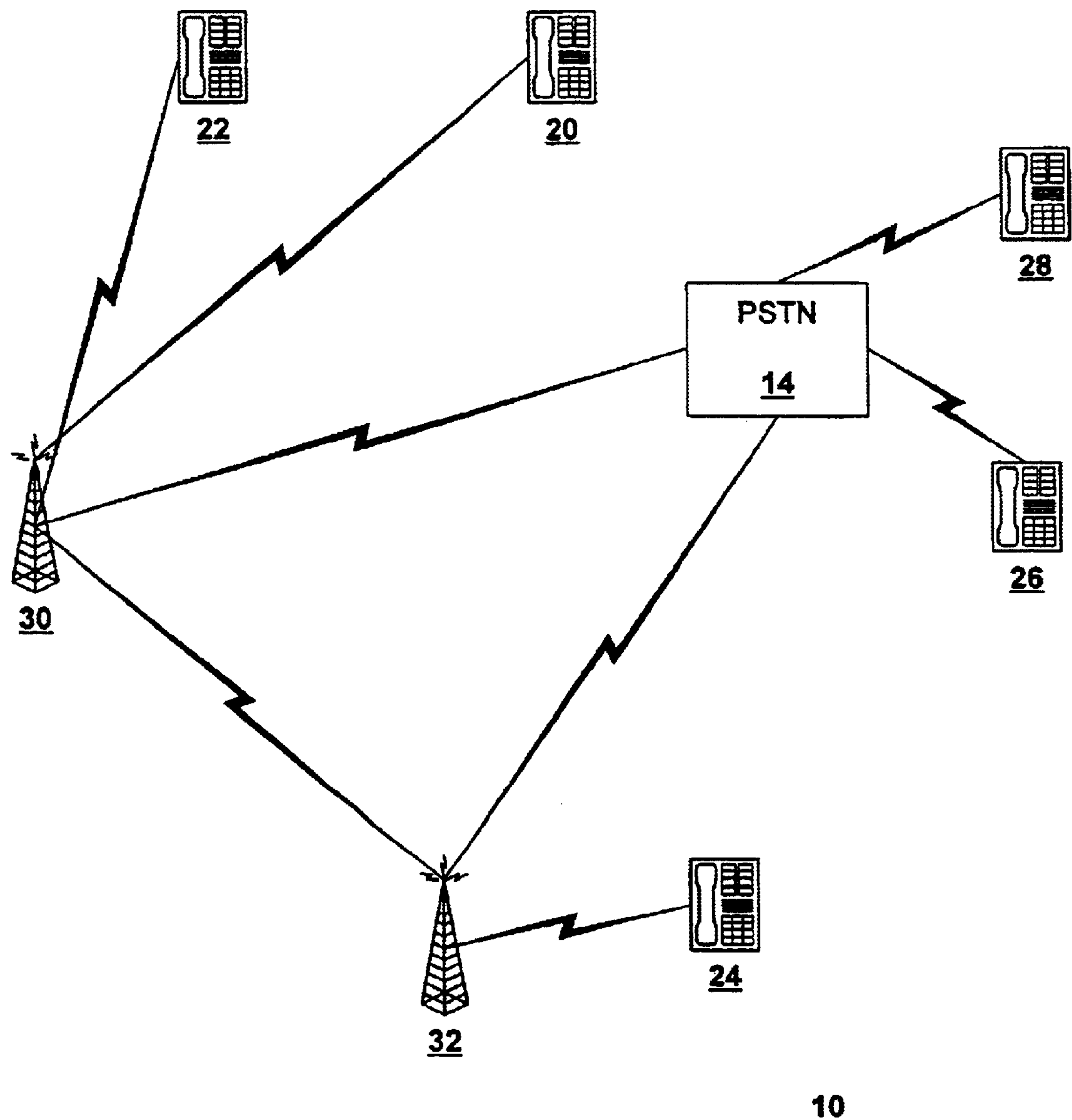
FIG. 1 is a diagram depicting a wireless communications network in which the systems and methods of the present invention may be implemented.

FIG. 1 depicts a wireless communications system 10 in which the methods and systems of the present invention may be used. As indicated in FIG. 1, a plurality of wireless terminals 20, 22, 24 communicate with each other and other terminals, such as terminals 26, 28 via a cellular telephone network and the public service telephone network ("PSTN") 14. Wireless terminals 20, 22, 24 might comprise, for example, wireless cellular telephones. In the cellular telephone network a plurality of base stations 30, 32 are provided. These base stations 30, 32 provide wireless communications links between each other and the wireless terminals 20, 22, 24 in their geographic area to allow for communications between the various wireless terminals 20, 22, 24 and the terminals 26, 28 in the PSTN.

Figure 2:
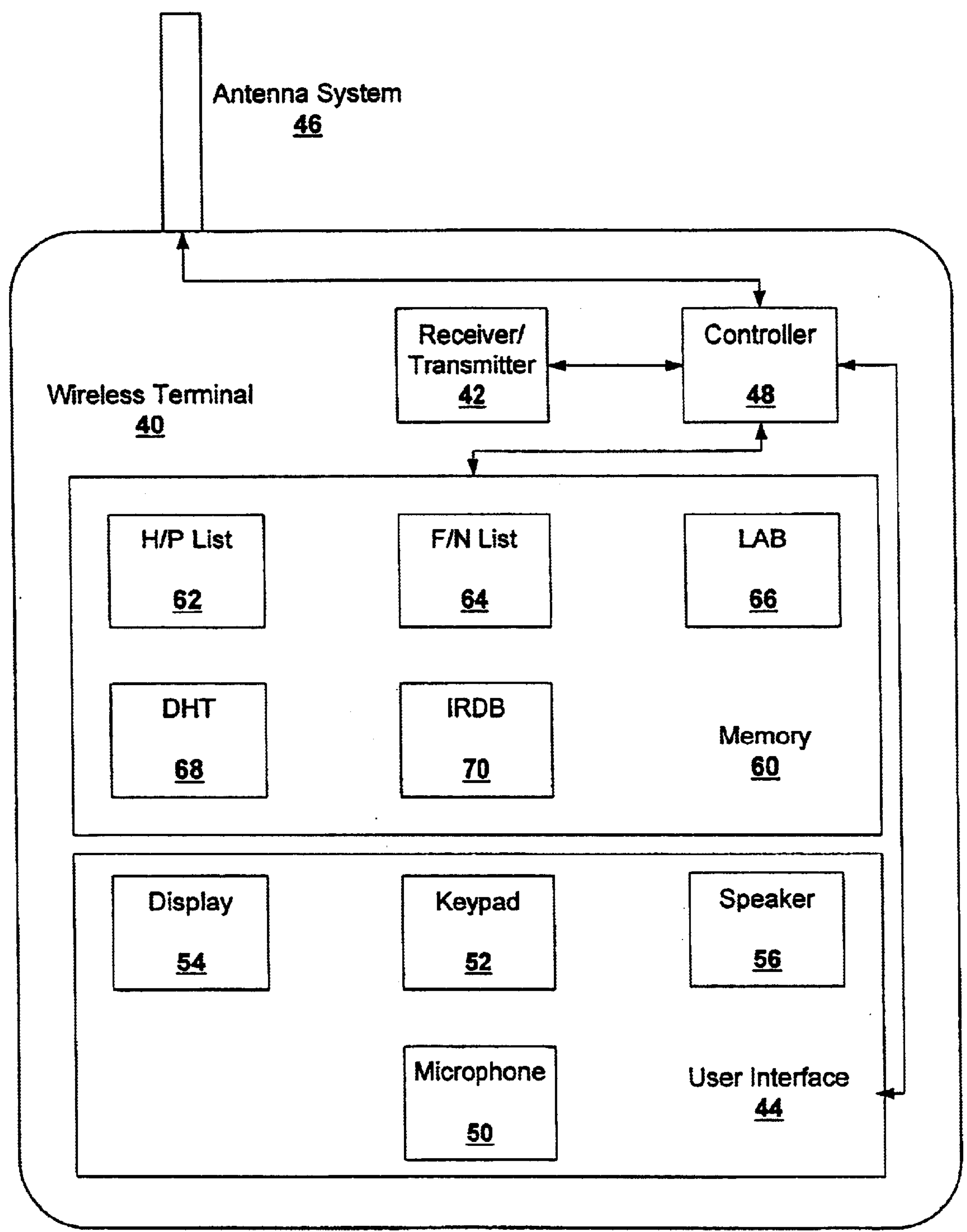
FIG. 2 is a block diagram illustrating a wireless terminal according to embodiments of the present invention.

FIG. 2 is a block diagram illustration which depicts an exemplary wireless terminal 40 according to embodiments of the present invention. As illustrated in FIG. 2, the wireless terminal 40 may include a transmitter/receiver or "transceiver" 42 that is operative to transmit and receive RF communication signals via an antenna system 46 under control of a controller 48. The antenna system may include an antenna feed structure and one or more antennas (not pictured in FIG. 2). The controller 48 may include a baseband processor and other circuitry, such as an RF processor, configured to step up signals for transmission to an assigned transmission frequency or to step down received signals from a modulation frequency to a baseband frequency. The baseband processor may include components such as demodulators, encoders/decoders, interleavers and other digital signal processing circuitry.

It will be appreciated that the transceiver 42, the controller 48 and other components of the wireless terminal 40 may be implemented using a variety of hardware and software. For example, operations of the transceiver 42 and/or the controller 48 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It will also be appreciated that, although functions of the transceiver 42 and/or the controller 48 may be integrated in a single device, such as a single ASIC microprocessor, they may also be distributed among several devices. Similarly, aspects of the transceiver 42, the controller 48 and other components of the wireless terminal may also be combined in one or more devices, such as an ASIC, DSP, microprocessor or microcontroller.

The controller 48 processes messages to produce physical layer bursts that are transmitted over wireless channels by the transceiver 42 via the antenna system 46. The controller 48, such as a microprocessor, microcontroller or similar data processing device, may execute program instructions stored in a memory 60 of the wireless terminal 40, such as a dynamic random access memory (DRAM), electrically erasable programmable read-only memory (EEPROM) or other storage device. In a particular embodiment of the present invention, the memory 60 is used to store, among other things, a variety of lists and databases that are described more fully herein. These lists and databases may include an H/P List 62, an F/N List 64, an LAB 66, a DCCH History Table or "DHT" 68, and an IRDB 70.

The controller 48 is further operatively associated with a user interface 44. The user interface 44 may include a variety of components, such as a display 54, a keypad 52, a speaker 56, and a microphone 50, operations of which are known to those of skill in the art and will not be further discussed herein.

As is well known to those of skill in the art, the transmitter portion of the transceiver 42 converts the information which is to be transmitted by the wireless terminal 40 into an electromagnetic signal suitable for radio communications. The receiver portion of the transceiver 42 demodulates electromagnetic signals which are received by the wireless terminal 40 so as to provide the information contained in the signals to the user interface 44 in a format which is understandable to the user. It is to be understood that the present invention is not limited to radiotelephones or other wireless terminals and may also be utilized with other wireless communication receivers and further for communications with computer storage medium, such as magnetic storage devices, to extract data.

The present invention is generally described herein in the context of a wireless terminal. As used herein, the term "wireless terminal" or "mobile terminal" may include, among other things, a cellular radiotelephone with or without a multi-line display; a Personal Communications System (PCS) terminal that may combine a cellular radiotelephone with data processing, facsimile and data communications capabilities; a Personal Data Assistant ("PDA") that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

In embodiments of the present invention, methods and systems are provided for efficiently performing an IR search. In certain of these embodiments, a wireless terminal selects a control channel from a plurality of channels which operate on a plurality of respective operating frequencies by scanning a first subset of the operating frequencies to locate a control channel that satisfies a first set of selection criteria. During this scan, channels also may be identified that fail to satisfy the first set of selection criteria but that have an increased probability of satisfying a second set of selection criteria. If one or more control channels are located that satisfy the first set of selection criteria, then one of those control channels is selected. If not, an order may be determined in which a second subset of the operating frequencies are to be scanned, wherein the order is based at least in part on the identification of channels that have an increased probability of satisfying a second set of selection criteria. Then, the second subset of the operating frequencies may be scanned in the determined order to locate a control channel that satisfies the second set of selection criteria.

In further embodiments of the present invention, the channels may be grouped into a plurality of frequency bands such that each frequency band includes multiple channels. In these embodiments, a channel may be identified as having an increased probability of satisfying the second set of selection criteria if it is in a frequency band operated by a Home or a Partner service provider. Additionally, channels that operate on a Forbidden band may be identified during the scan of the first subset of the operating frequencies. In such embodiments, the step of scanning the second subset of the operating frequencies may comprise scanning operating frequencies in the frequency bands that are not identified as Forbidden.

In certain embodiments of the methods and systems of the present invention, the first subset of the operating frequencies comprises operating frequencies that correspond to private channels. In these embodiments, a private channel may be considered to meet the first set of selection criteria if it is a control channel and if it has a received signal strength that exceeds a first threshold. In these embodiments, the second subset of the operating frequencies may comprise operating frequencies corresponding to control channels on which the terminal has previously camped.

In other embodiments of the present invention, during the scan of the second subset of the operating frequencies, the frequency bands that include channels identified as having an increased probability of satisfying the second set of selection criteria are scanned first. In these embodiments, channels in the frequency band on which the terminal last camped may be scanned immediately after the scan of the frequency bands that include channels identified as having an increased probability of satisfying the second set of selection criteria.

In further embodiments of the present invention, the methods and systems may further include a scan of a third subset of the operating frequencies for a control channel that satisfies the second set of selection criteria. In these embodiments, the third subset of the operating frequencies may include operating frequencies in each of the plurality of frequency bands. During the scan of this third subset of the operating frequencies, the frequency bands that include channels identified as having an increased probability of satisfying the second set of selection criteria may be scanned first. In additional embodiments of the present invention, channels operated by a Favored or a Neutral service provider may be identified during the scan of the first subset of the operating frequencies.

Methods and systems are also provided for a wireless terminal to scan a plurality of public and private channels provided on a plurality of respective operating frequencies that are grouped into a plurality of frequency bands. The operating frequencies that correspond to a subset of the private control channels are scanned first, and during this scan frequency bands that are operated by a Home or a Partner service provider may be identified. Thereafter, the operating frequencies that correspond to public control channels on which the terminal has previously camped may be scanned to the extent that those channels are in frequency bands identified as being operated by the Home or Partner service providers. After this second scan, operating frequencies that correspond to public control channels on which the terminal has previously camped that are in frequency bands other than those identified as being operated by Home or Partner service providers may be scanned. Finally, the wireless terminal may perform a wideband scan in which the operating frequencies having the highest received signal strength values in a plurality of the frequency bands are scanned.

Operations of the present invention will now be described with respect to the flowchart illustrations of FIGS. 3–11. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

As noted above, pursuant to embodiments of the present invention, methods and systems are provided for a wireless terminal to select a control channel from a plurality of control channels. This selection may be done, for example, to locate a control channel on which the wireless terminal will camp or remain idle. The flow chart of FIG. 3 depicts such embodiments of the present invention.

Figure 3:
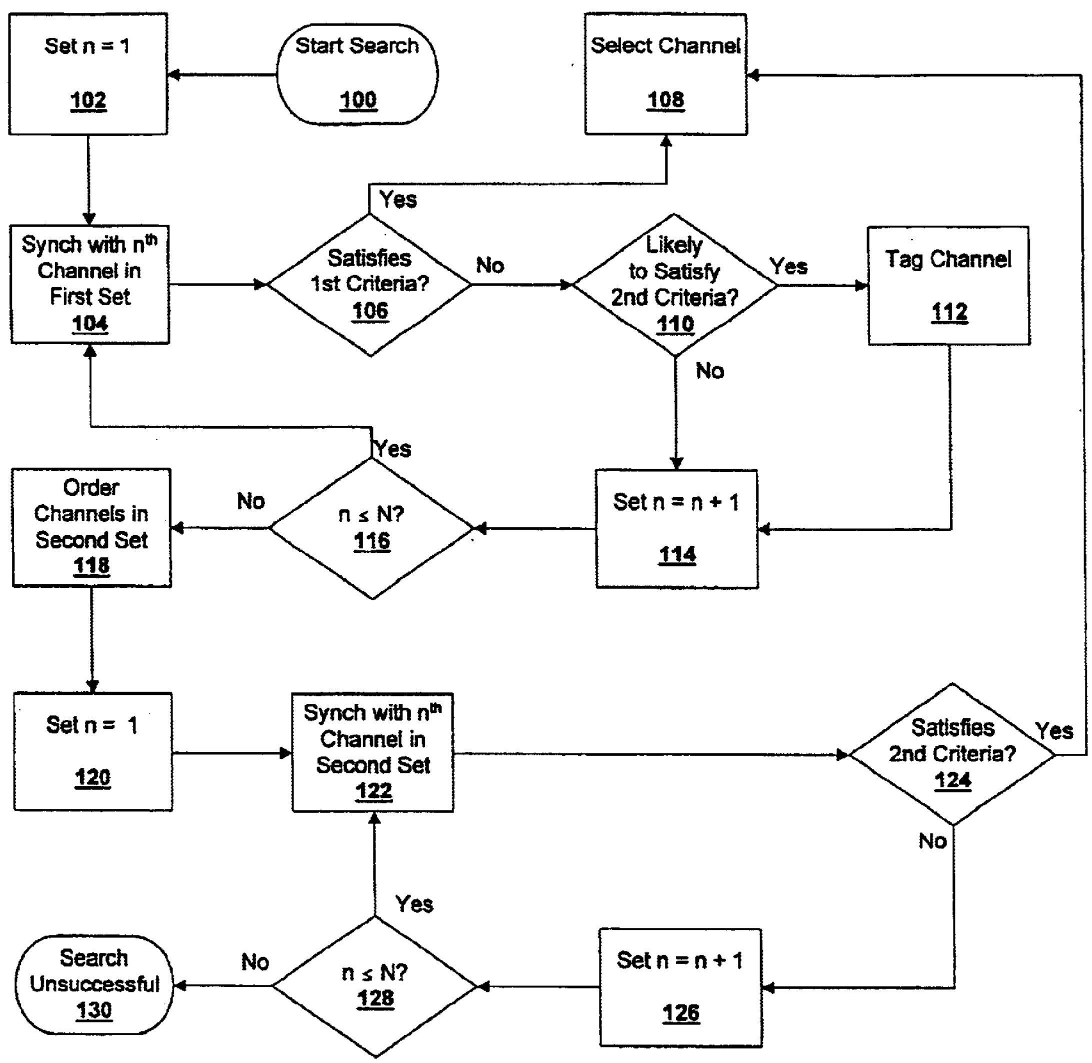
FIG. 3 is a flow chart illustrating operations for selecting a control channel according to embodiments of the present invention.

As shown in FIG. 3, the search for the control channel to be selected starts by setting a counter n equal to one (block 102). The wireless terminal then tunes to the operating frequency corresponding to the $n^{th}$ channel (which in this case is the first channel) in a first set of channels, and attempts to acquire synchronization with that channel (block 104). This first set of operating frequencies could be selected based on a variety of criteria, but typically will correspond to channels that are believed to be likely to satisfy the selection criteria or to channels which are preferred for some reason. Thus, for example, the first set of operating frequencies could correspond to private control channels which comprise preferred control channels for the wireless terminal or control channels with which the wireless terminal has recently or consistently camped on in the past.

If the channel is successfully acquired, the wireless terminal determines if the channel satisfies a first set of one or more selection criteria (block 106). These selection criteria might include, for example, a requirement that the control channel be part of a private system or be operated by a Home or Partner service provider. The selection criteria will also generally include a received signal strength requirement or some other criteria that increases the likelihood that signals received over the control channel will be sufficiently clear of interference. If the $n^{th}$ channel satisfies the selection criteria (block 106), then the $n^{th}$ channel is selected (block 108), and the search is concluded. If not, the $n^{th}$ channel is further evaluated to determine if it includes one or more characteristics or attributes that indicate that it is likely to satisfy a second set of one or more selection criteria (block 110). By way of example, the $n^{th}$ channel may be evaluated at block 108 to determine if it is operated by a Home or Partner service provider, and/or may be evaluated in terms of its receive signal strength. If the $n^{th}$ channel is determined to be likely to satisfy the second set of selection criteria, then it is tagged or otherwise identified by the wireless terminal in some manner (block 112). For example, the channel might be added to a list of channels that are deemed worthy of increased scrutiny if a search of a second set of operating frequencies is ultimately deemed necessary.

After the $n^{th}$ channel is either "tagged" (block 112) or determined at block 110 to be not likely to satisfy the second set of selection criteria, the counter n is incremented by one (block 114). The counter n is then compared (block 116) to a number N, where N corresponds to the number of channels/operating frequencies in the first set. If n is less than or equal to N, then at least one of the operating frequencies in the first set has not been examined to determine if it satisfies the first set of selection criteria. In this case, the method continues as described above at block 104.

Once all of the operating frequencies in the first set have been examined to determine if they satisfy the first set of selection criteria, n will exceed N at block 116. When this occurs, a suitable control channel was not identified in the first set of operating frequencies. In such a situation, it becomes necessary to search at least one additional set of operating frequencies for an acceptable control channel. Pursuant to the teachings of the present invention, it will be understood that the search of this second set of operating frequencies may be more efficiently performed by utilizing information learned during the search of the first set of operating frequencies to determine which operating frequencies are scanned during the second stage of the search, and to determine the order in which the operating frequencies in the second set are examined.

In particular, as illustrated in FIG. 3, prior to scanning the second set of operating frequencies, the order in which those operating frequencies may be determined (block 118). The order that is determined is based, at least in part, on the identification of channels performed (see block 112) during the scan of the first set of operating frequencies. Once the order is determined, the counter n is reset to one (block 120). The wireless terminal then tunes to the operating frequency corresponding to the $n^{th}$ channel (which in this case is the first channel) in the second set of operating frequencies, and attempts to acquire synchronization with that channel (block 122).

If the channel is successfully acquired, the wireless terminal determines if the channel satisfies the second set of selection criteria as discussed above (block 124). If so, then the $n^{th}$ channel is selected (block 108), and the search is concluded. If not the counter n is incremented by one (block 126). The counter n is then compared (block 128) to a number N, where N corresponds to the number of operating frequencies in the second set of operating frequencies. If n is less than or equal to N, then at least one of the operating frequencies in the second set has not been examined to determine if it satisfies the second set of selection criteria. In this case, the method continues as described above at block 122. If all the operating frequencies in the second set have been examined, then the search concludes unsuccessfully (block 130).

In additional embodiments of the present invention, the methods and systems illustrated in FIG. 3 may be modified to further take advantage of information learned during the scan of the first set of operating frequencies. By way of example, as noted above, in many wireless communications systems certain bands or channels may be off limits or "Forbidden" to a particular wireless terminal. If such bands or channels are identified during the scan of the first set of operating frequencies, they may be tagged or otherwise identified so that in a second or later scan of a set of operating frequencies the wireless terminal excludes the Forbidden bands/channels from the scan. Likewise, less preferred service providers may also be identified during the first scan of the operating frequencies, as it may be more efficient to delay scanning the bands/channels operated by these service providers until a third, fourth or later stage in the search.

It will also be appreciated that the methods and systems depicted in FIG. 3 may be expanded to include more than two scans of sets of potential operating frequencies. In fact, as noted above with respect to the TIA/EIA-136 standard, more than two separate scans are often performed. Pursuant to the teachings of the present invention, it will be realized that certain information may be acquired during the initial scans of the operating frequencies, and this information may be "fed-forward" to more efficiently conduct later scans. These efficiencies may be gained, for example, by (i) identifying bands and channels where it is deemed more likely that an acceptable control channel will be found, (ii) identifying bands and channels that are deemed less likely to contain an acceptable control channel (so that scans of those bands/channels may be delayed until the end of the search), and (iii) minimizing or eliminating instances where the same channel is scanned on multiple occasions during the search.

Figure 4:
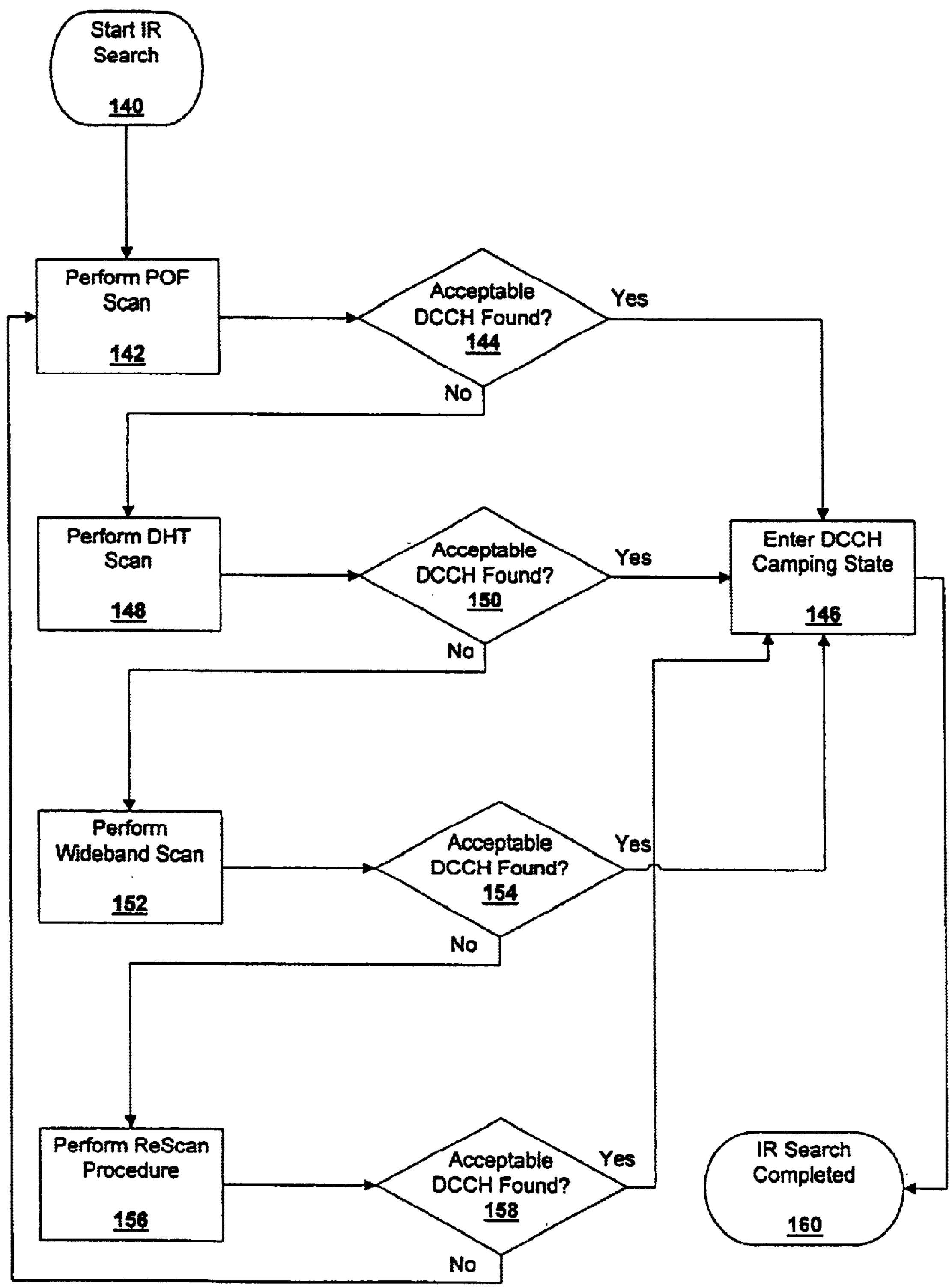
FIG. 4 is a flow chart illustrating operations for selecting a control channel according to further embodiments of the present invention.

Embodiments of the present invention will now be described with respect to FIGS. 4 through 11 that may be particularly useful in TIA/EIA-136 or similar systems. FIG. 4 overviews the four stages of an IR search performed according to these embodiments. As shown in FIG. 4, the IR search begins (block 140) with a scan of the private operating frequencies which are listed in the memory of the wireless terminal (block 142). If an acceptable DCCH control channel is identified during this scan (block 144), the wireless terminal enters the DCCH camping state on that channel (block 146). If, however, an acceptable DCCH control channel is not identified during the POF scan, the wireless terminal then initiates the second stage of the IR search, which is a scan of some or all of the channels listed in the DCCH History Table ("DHT") stored in memory at the wireless terminal (block 148). If an acceptable DCCH control channel is identified during the DHT scan (block 150), the wireless terminal enters the DCCH camping state on that channel (block 146). If, however, an acceptable DCCH control channel is not identified during the DHT scan, the wireless terminal then proceeds to the third (wideband scan) stage of the IR search (block 152). If an acceptable DCCH control channel is identified during the wideband scan (block 154), the wireless terminal enters the DCCH camping state on that channel (block 146). If not, the wireless terminal then proceeds to the final stage (the re-scan procedure) of the IR search in which bands/channels operated by Favored or Neutral service providers are examined (block 156). If an acceptable DCCH control channel is identified during this re-scan stage of the search (block 158), the wireless terminal enters the DCCH camping state on that channel (block 146). If not, the wireless terminal re-initiates the search procedure (block 142).

As shown in FIG. 4, the goal of the IR search is to identify an "acceptable" DCCH control channel. However, as will be appreciated by those of skill in the art, what is considered "acceptable" may differ at the different stages of the search. By way of example, in embodiments of the present invention, during the POF scan only a private control channel or a control channel in a residential system typically will be considered an acceptable control channel. In contrast, during the DHT and wideband scans, public control channels may be acceptable if they are on bands operated by Home or Partner service providers. Finally, during the re-scan procedure, public control channels on frequency bands operated by Favored or Neutral service providers may be considered acceptable.

Figure 5:
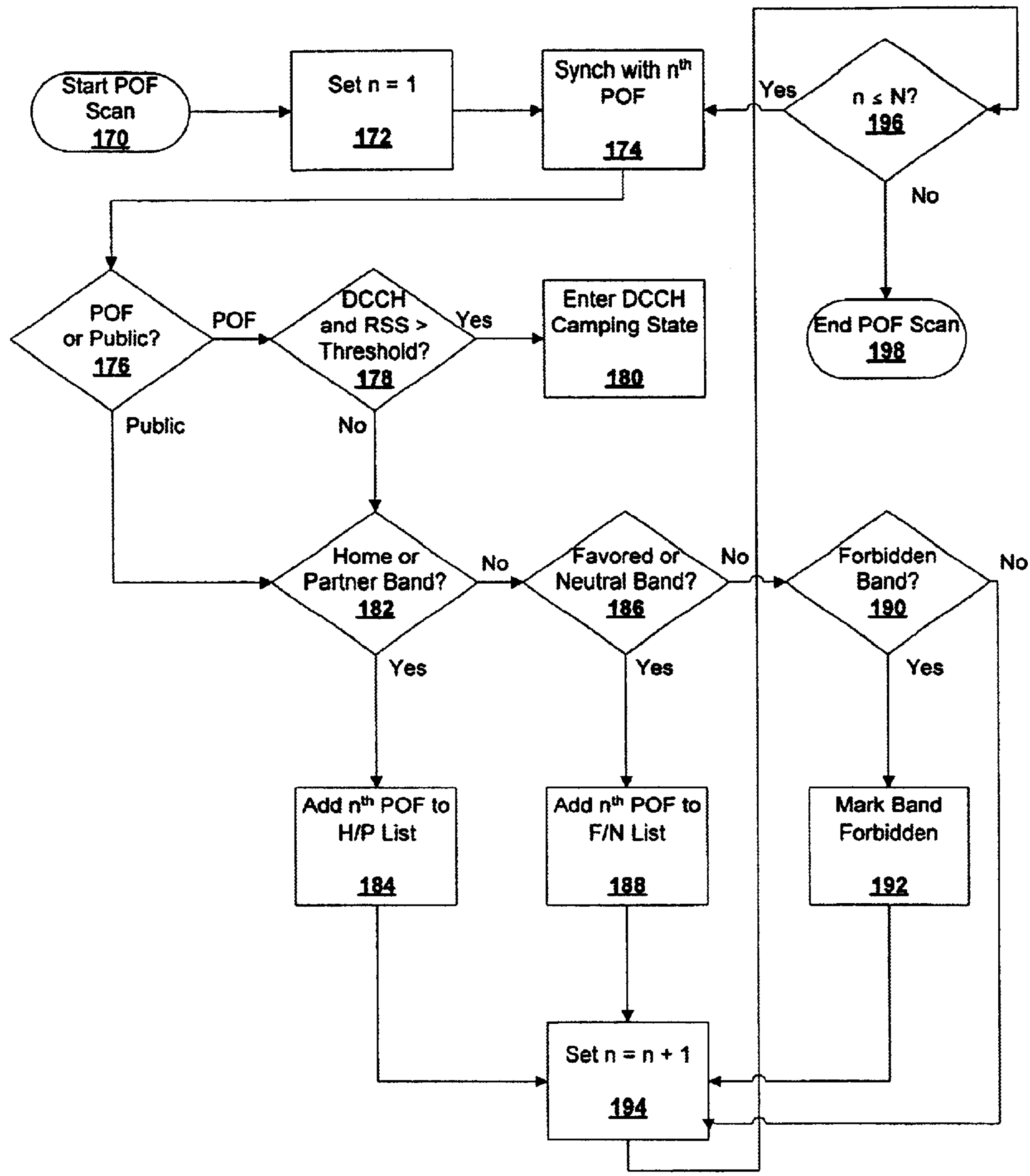
FIG. 5 is a flow chart illustrating operations for performing blocks 142 and 144 of FIG. 4 according to embodiments of the present invention.

FIG. 5 provides further detail regarding how the POF scan of block 142 of FIG. 4 may be implemented according to embodiments of the present invention. As shown in FIG. 5, at the beginning of the POF scan (block 170) a counter "n" is set to one (block 172). The wireless terminal then attempts to acquire synchronization with the $n^{th}$ private operating frequency (in this case the first) listed in the memory in the wireless terminal (block 174). Once the wireless terminal acquires synchronization with the $n^{th}$ channel, it determines whether or not the channel is the private operating frequency or residential system listed in its database or some other public channel (block 176). If it is the private operating frequency or residential system, the wireless terminal determines whether (a) the channel is in fact a control channel and (b) whether or not the signal being transmitted over that control channel has the minimum specified received signal strength (block 178). If these selection criteria are satisfied, the wireless terminal enters the DCCH camping state on the $n^{th}$ private operating frequency (block 180).

If the wireless terminal determines that the channel is not a control channel or that the strength of signal received over the channel is below the minimum specified level (block 178), the wireless terminal does not attempt to camp on the channel. However, at this point the wireless terminal obtains information regarding the frequency band on which the $n^{th}$ POF is operating. In particular, the wireless terminal first determines whether or not the $n^{th}$ POF is on a band operated by either a Home or Partner service provider (block 182). If so, the band and channel number of the $n^{th}$ private operating frequency are added to a list that is maintained in memory at the wireless terminal that is referred to herein as the Home/Partner or "H/P" List (block 184). If the $n^{th}$ POF is not on a frequency band operated by a Home or Partner service provider (block 182), the wireless terminal determines if the $n^{th}$ POF is on a frequency band operated by a Favored or Neutral service provider (block 186). If it is, the band and channel number of the $n^{th}$ POF are added to a second list that is maintained in memory at the wireless terminal that is referred to herein as the Favored/Neutral or "F/N" List (block 188). If at block 186 it is determined that the $n^{th}$ POF also is not on a band operated by a Favored or Neutral service provider, the wireless terminal then determines if the band of the $n^{th}$ POF is Forbidden (block 190). If it is, a table in the wireless terminal is updated to mark the band of the $n^{th}$ POF as Forbidden (block 192).

After the H/P, F/N or Forbidden Lists have been updated (blocks 184, 188, 192, respectively), the counter n is incremented by one (block 194). If n is less than or equal to N (block 196), where N is the number of private operating frequencies stored in the wireless terminal's memory, the process continues as described above at block 174. If n exceeds N (block 196), then all of the POFs have been scanned without identification of an acceptable POF control channel, and the POF portion of the IR search is concluded (block 198).

As will be appreciated by those of skill in the art, it is not necessary to scan all the POFs stored in memory at the wireless terminal during the POF scan of the IR search. In fact, in many instances it may be most efficient to scan only a subset of the POFs. Thus, in one embodiment of the present invention, at the beginning of the POF scan the received signal strength of every POF is measured, and the POFs having the two highest received signal strengths are selected for the POF scan. Thus, in this embodiment of the present invention, the value of N in FIG. 5 is two, and the only POFs with which the wireless terminal may acquire synchronization during the POF scan are the two POFs having the highest received signal strength.

In embodiments of the present invention, the H/P List is maintained as a non-redundant list of band-channel pairs. Each band-channel pair represents the band and channel number of a channel that was scanned that resides on a frequency band operated by either a Home or Partner service provider. In these embodiments of the present invention, only a single band-channel pair is included in the H/P List for any given frequency band. Consequently, if two channels are identified in a Home or Partner service provider frequency band during a scan, the "better" of these two channels (i.e., in signal strength, because it is a control channel, etc.) is the channel listed for the band in the H/P List. The H/P List may be ordered based on service provider, with band-channel pairs associated with Home service providers listed before band-channel pairs associated with Partner service providers.

Likewise, in embodiments of the present invention, the F/N List is also maintained as a non-redundant list of band-channel pairs. Each band-channel pair represents the band and channel number of a channel that was scanned that resides on a frequency band operated by either a Favored or Neutral service provider. In some embodiments of the present invention, only a single band-channel pair is included in the F/N List for any given frequency band. In other embodiments, however, multiple channels from a given frequency band may be stored in the F/N list, so as to allow the F/N list to replace the re-scan list used in TIA/EIA-136. The F/N List need not be maintained in any particular order, although in some embodiments it may be preferable to order the list based on service provider, with band-channel pairs associated with a Favored service provider listed before band-channel pairs associated with Neutral service providers. Both the H/P List and the F/N List may be cleared at the initiation of the POF scan.

Figure 6A:
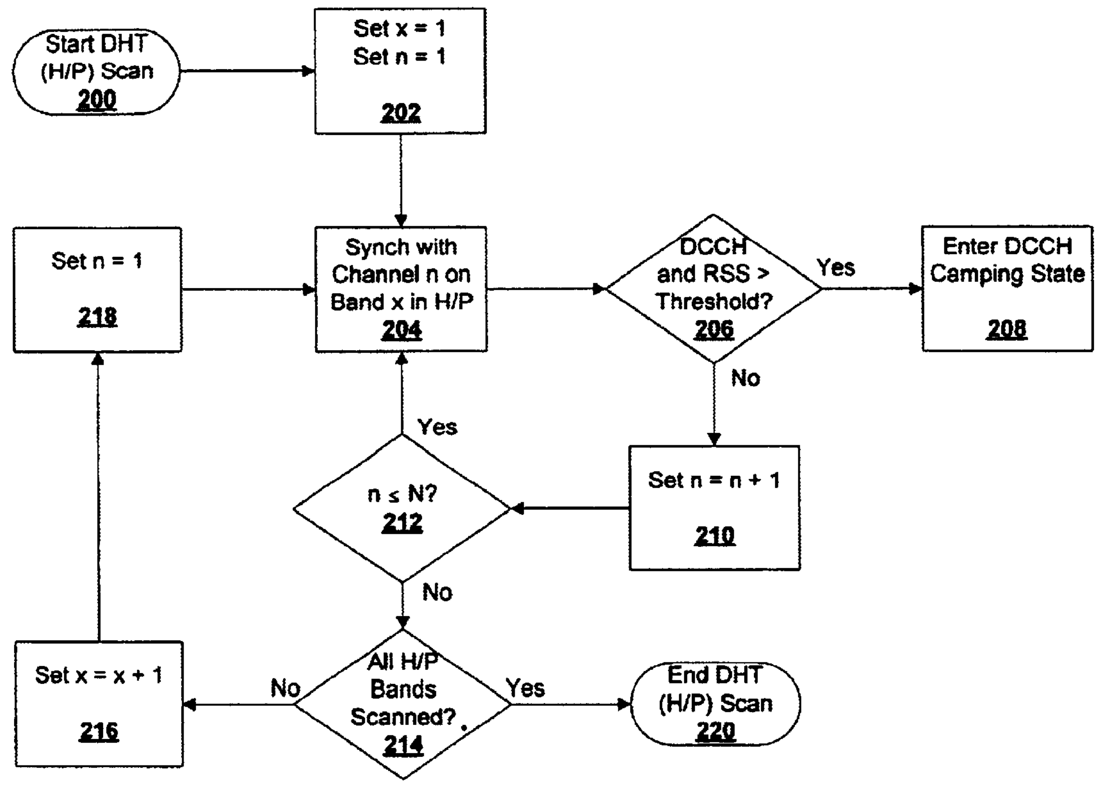
FIG. 6A is a flow chart illustrating operations for performing a portion of blocks 148 and 150 of FIG. 4 according to embodiments of the present invention.
Figure 6B:
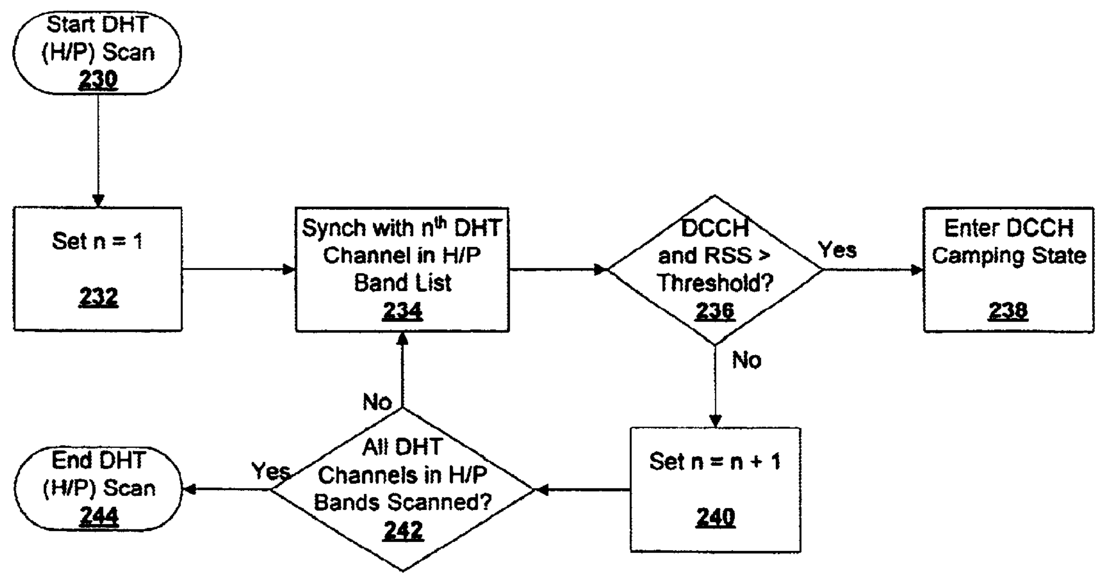
FIG. 6B is a flow chart illustrating operations for performing a portion of blocks 148 and 150 of FIG. 4 according to further embodiments of the present invention.
Figure 7:
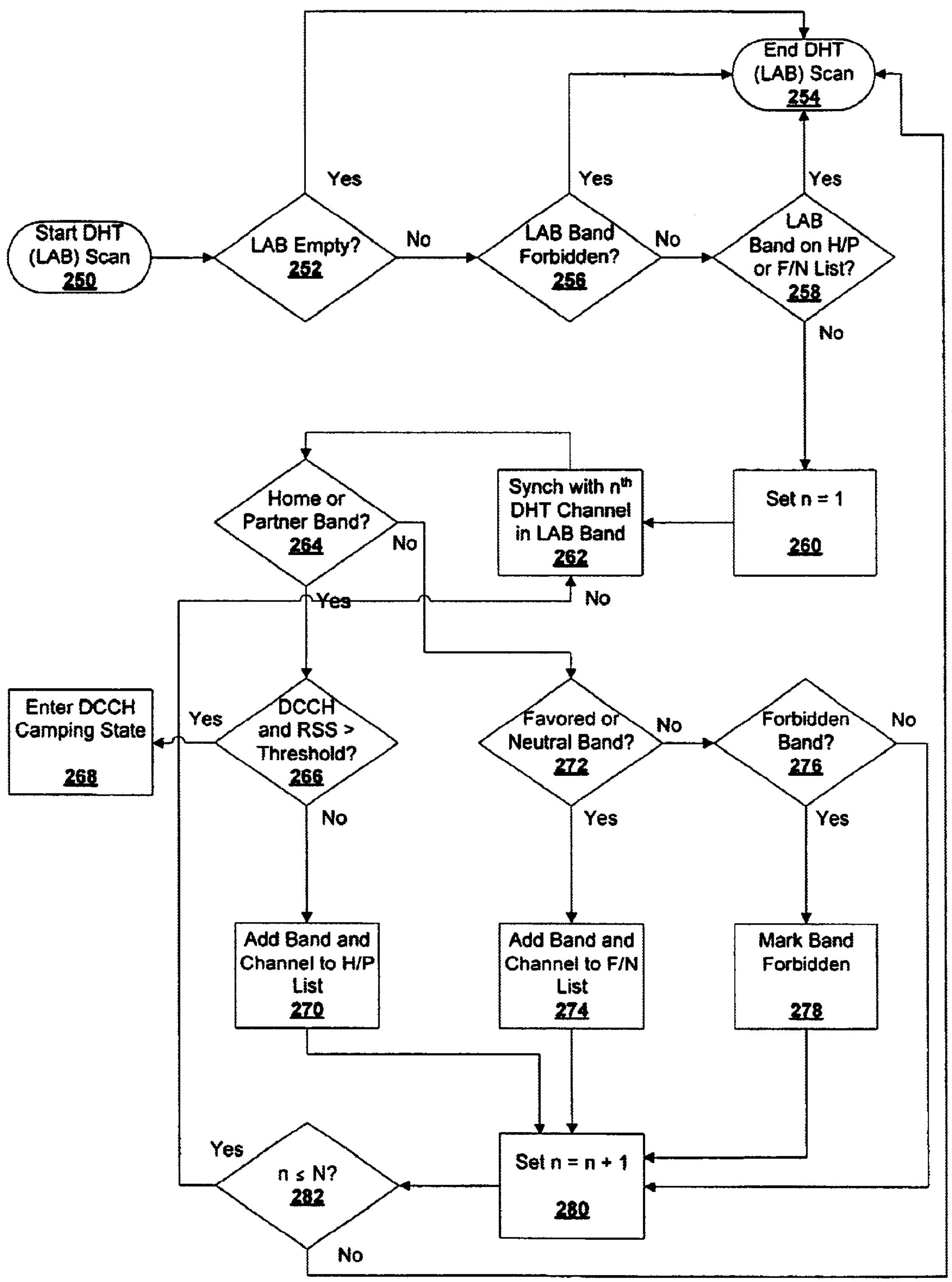
FIG. 7 is a flow chart illustrating operations for performing a portion of blocks 148 and 150 of FIG. 4 according to embodiments of the present invention.
Figure 8:
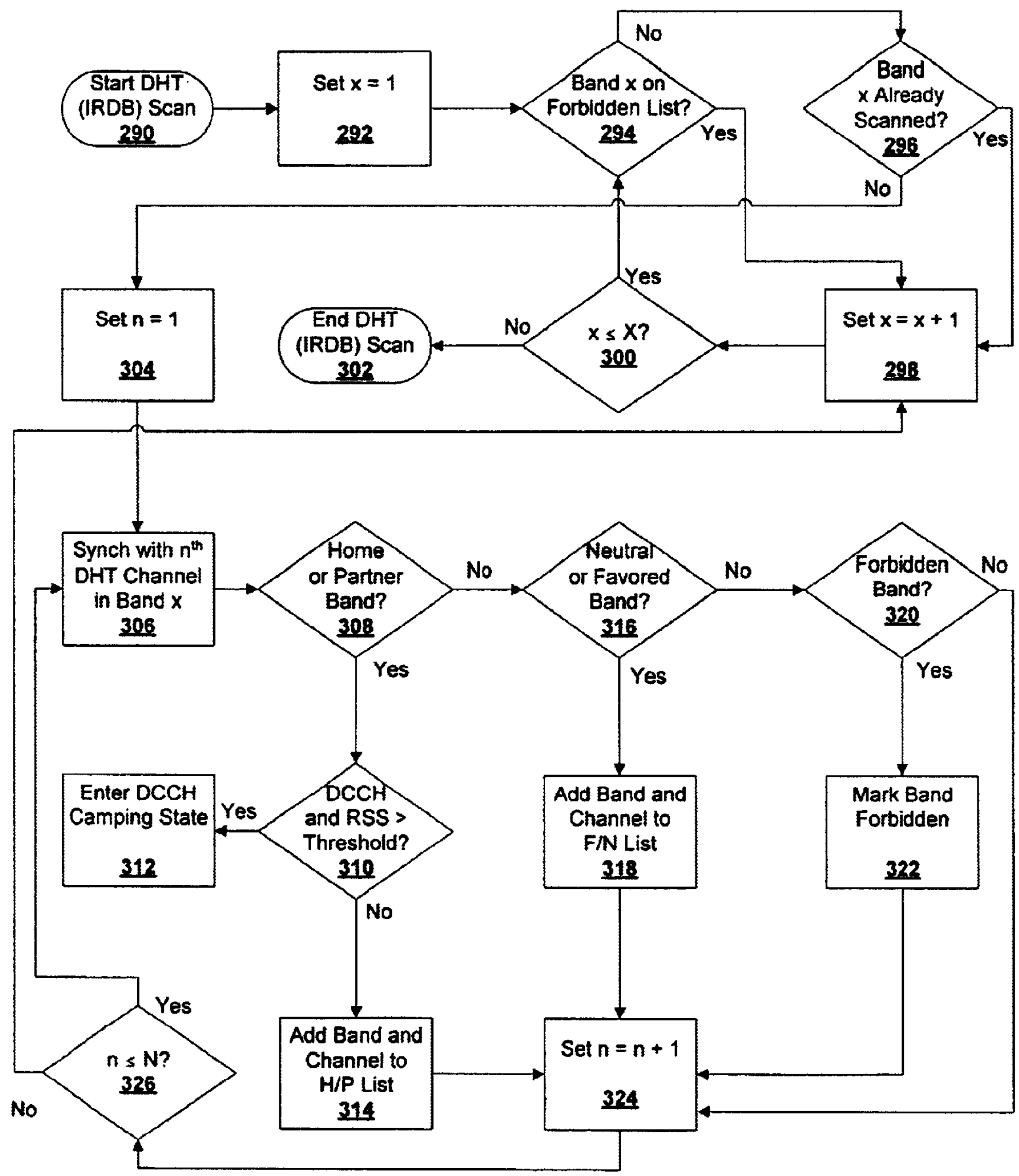
FIG. 8 is a flow chart illustrating operations for performing the remaining portion of blocks 148 and 150 of FIG. 4 according to embodiments of the present invention.

FIGS. 6–8 provide further detail regarding how the DHT scan of block 148 of FIG. 4 may be implemented according to embodiments of the present invention. Under the TIA/EIA-136 standard, the DHT scan is conventionally performed by first scanning control channels that are in the Last Available Band or "LAB" (if any) specified in the memory of the wireless terminal, and by then scanning control channels in the remaining bands in the band order specified in the wireless terminal's IRDB database. The LAB is typically implemented as a pointer or index in the DHT table that identifies the channels in the DHT table that are in the frequency band on which the wireless terminal last camped on a control channel. Pursuant to the teachings of the present invention, it will be understood that the IR search may be more efficiently performed by modifying the order in which the bands are scanned during the DHT scan. In particular, instead of starting the DHT scan by examining the LAB band, the DHT scan starts by examining control channels in any frequency band which was identified during the POF scan as being operated by a Home or Partner service provider (the "H/P portion" of the DHT scan). Embodiments of this portion of the DHT scan are illustrated in FIGS. 6A and 6B.

After the identified Home and Partner service provider bands have been scanned, the DHT scan of the IR search continues according to embodiments of the present invention by scanning control channels in the frequency band (if any) that is identified as the LAB band in the memory of the wireless terminal. This portion (the "LAB portion") of the DHT scan is not done, however, if the LAB band was identified as a Home or Partner service provider frequency band during the POF scan such that the LAB band was already examined during the initial phase of the DHT scan. FIG. 7 illustrates one embodiment of the LAB band portion of the DHT scan according to the teachings of the present invention. Finally, the DHT scan may be concluded by scanning any remaining frequency bands for which there are entries in the DHT table stored in memory at the wireless terminal. These frequency bands may be scanned in the order specified in the IRDB database stored at the wireless terminal. FIG. 8 illustrates this final portion ("the IRDB order portion") of the DHT scan.

As noted above, FIG. 6A depicts one embodiment of the H/P portion of the DHT scan. As shown in FIG. 6A, the DHT scan starts (block 200) by setting two counters, "x" and "n" to one (block 202). The counter "x" is used to keep track of the frequency bands which were identified as Home or Partner frequency bands during the POF scan. The counter "n" is used to keep track of the channels within each of the frequency bands x which are scanned during the H/P portion of the DHT scan. After setting the counters to one, the wireless terminal attempts to acquire synchronization with the $n^{th}$ channel (in this case the first) that is to be examined in the $x^{th}$ frequency band (in this case the first) that was identified as a Home or Partner service provider frequency band during the POF scan (block 204). After acquiring synchronization, the wireless terminal determines whether (a) the channel is a public control channel and (b) whether or not the signal being transmitted over the channel has the minimum specified signal strength (block 206). If these selection criteria are satisfied, the wireless terminal enters the DCCH camping state on the control channel (block 208).

If the wireless terminal determines that the channel is not a control channel or that the strength of signal received over the channel is below the minimum specified level (block 206), the wireless terminal does not attempt to camp on the channel and instead increments the counter "n" by one (block 210). The wireless terminal then compares "n" to a number "N" (block 212), where "N" represents the number of channels in the x frequency band which are to be examined during the H/P portion of the DHT scan. If "n" is less than or equal to "N", the process continues as described above through blocks 204, 206, 208, 210, 212 for the next channel in frequency band x. If not, the wireless terminal determines whether or not every frequency band that was identified as a Home or Partner service provider frequency band during the POF scan has been scanned in the H/P portion of the DHT scan (block 214). If one or more frequency bands remain to be scanned, "x" is incremented by one (block 216), "n" is set to one (block 218), and the process continues for the first channel in the next frequency band at block 204. If at block 214 all the identified Home and Partner service provider frequency bands have been scanned, then the H/P portion of the DHT scan is completed (block 220).

As will be understood by those of skill in the art, in the embodiment of FIG. 6A, either some or all of the channels within each of the frequency bands identified as a Home or Partner frequency band may be scanned. Thus, in one embodiment of the present invention, all the channels in each Home and Partner frequency band are scanned, such that "n" will range from 1 to the number of channels within each Home or Partner frequency band x. However, it will be appreciated that in many situations, it may be more efficient to only scan a subset of the channels within each identified Home and Partner frequency band. The selection of which channels, and how many, may be done in a variety of ways. By way of example, in one embodiment of the present invention, each identified Home and Partner frequency band is divided into a plurality of sub-bands or probability blocks. At the beginning of the DHT scan, the received signal strength of all the channels in each identified Home and Partner frequency band is examined, and the two channels in each sub-band or probability block having the highest received signal strength are selected for scanning.

FIG. 6B depicts another embodiment of the H/P portion of the DHT scan. In this embodiment, only channels which are actually listed in the DHT table stored in memory at the wireless terminal are examined during the H/P portion of the DHT scan. In the embodiment of FIG. 6B, a single counter "n" is initially set to one (block 232). This counter "n" is used to keep track of the channels that are included in the DHT table that are in a frequency band that was identified as a Home or Partner service provider frequency band during the POF scan stage of the IR search. Thus for example, assuming that the DHT table at the wireless terminal has twelve entries, which correspond to three entries each for four different frequency bands, and further assuming that two of those four frequency bands were identified as Home or Partner service provider frequency bands during the POF scan, then a total of six channels would be scanned during the H/P portion of the DHT search in the embodiment of FIG. 6B, and "n" would range from 1 to 6.

After the counter "n" is set to one, the wireless terminal attempts to acquire synchronization with the $n^{th}$ channel (in this case the first) included in the DHT table that is in an identified Home or Partner service provider frequency band (block 234). After acquiring synchronization, the wireless terminal determines whether (a) the channel is a public control channel and (b) whether or not the signal being transmitted over the channel has the minimum specified signal strength (block 236). If these selection criteria are satisfied, the wireless terminal enters the DCCH camping state on the control channel (block 238).

If the wireless terminal determines that the channel is not a control channel or that the strength of signal received over the channel is below the minimum specified level (block 236), the wireless terminal does not attempt to camp on the channel and instead increments the counter "n" by one (block 240). The wireless terminal then determines whether or not all the channels listed in the DHT table which are part in frequency bands that were identified as Home or Partner service provider frequency bands during the POF stage of the IR search have been scanned (block 242). This may be done by comparing "n" to a number "N", where "N" represents the number of channels in the DHT table which are in identified Home or Partner service provider frequency bands. If "n" is less than or equal to "N", the process continues as described above through blocks 234, 236, 238, 240, 242 for the next channel from an identified Home or Partner service provider frequency band in the DHT table. If "n" exceeds "N", then the H/P portion of the DHT scan has been completed without identification of an acceptable DCCH control channel (block 244).

FIG. 7 illustrates an embodiment of the LAB portion of the DHT scan according to the teachings of the present invention. As noted above, this portion of the DHT scan is performed if an acceptable control channel is not identified in either the POF scan or the H/P portion of the DHT scan. As shown in FIG. 7, the first step in the LAB portion of the DHT scan is to determine whether or not there is an entry in the LAB table stored in the memory of the wireless terminal (block 252). If it is empty, then the LAB portion of the DHT scan is concluded (block 254) as the wireless terminal does not know which band was the last acceptable band on which it had camped. If the LAB table includes an entry, the wireless terminal then determines whether or not the LAB band is marked Forbidden (block 256). If the frequency band that was the LAB band is marked Forbidden, then the LAB portion of the DHT scan is completed (block 254). This might happen, for example, if the wireless terminal is performing the IR search in a different geographic area from the last geographic area in which it was used, and in this new location, the frequency band listed in the LAB table is Forbidden. Moreover, while the wireless terminal normally might have no way of knowing that in this new geographic area the LAB band was Forbidden, as noted above, during the POF scan the wireless terminal may identify bands which are Forbidden and feed this information forward so as to allow for more efficient searching in later scans in the IR search.

If the LAB band is not Forbidden (block 256), the wireless terminal next determines if the LAB band is listed on either the H/P or F/N Lists (block 258). If the LAB band is listed on either of these lists, then the LAB portion of the DHT scan is concluded (block 254). The determination at block 258 is conducted because if the LAB band is on the H/P list, this band was already scanned during the H/P portion of the DHT scan, and, hence, it may be inefficient to re-scan the same band. Similarly, if the LAB band is listed on the F/N list, it by definition cannot contain a control channel that will satisfy the selection criteria in place during the DHT scan, since a control channel is only selected during the DHT scan if it, among other things, is on a Home or Partner service provider frequency band.

If the LAB band is not on the H/P or F/N lists (block 258), then a counter "n" is set to one (block 260). This counter "n" is used to track the channels in the LAB band which are to be scanned during the LAB portion of the DHT scan. After the counter is set to one, the wireless terminal attempts to acquire synchronization with the $n^{th}$ channel (in this case the first) included in the DHT table that is in the LAB frequency band (block 262). The wireless terminal then determines whether or not this channel is on a frequency band operated by a Home or Partner service provider (block 264). If the channel is on a frequency band operated by a Home or Partner service provider, the wireless terminal determines whether (a) the channel is a public control channel and (b) whether or not the signal being transmitted over the channel has the minimum specified received signal strength (block 266). If these selection criteria are satisfied, the wireless terminal enters the DCCH camping state on the control channel (block 268). If the wireless terminal determines that the channel is not a public control channel or that the strength of signal received over the channel is below the minimum specified level (block 266), the wireless terminal does not attempt to camp on the channel. However, at this point the wireless terminal again acts to obtain information regarding the band on which the $n^{th}$ POF is operating for use in later stages of the IR search. In particular, since the wireless terminal now knows that the LAB band is a frequency band operated by either a Home or Partner service provider, the LAB band is added to the H/P list (block 270).

Similarly, if at block 264 the wireless terminal determines that the LAB band is not a frequency band operated by either a Home or Partner service provider, the wireless terminal then determines whether or not the LAB band is operated by a Favored or Neutral service provider (block 272). If it is, the band and channel number of the $n^{th}$ channel in the LAB band are added to F/N List (block 274). If at block 274 it is determined that the $n^{th}$ channel on the LAB band is not on a band operated by a Favored or Neutral service provider, the wireless terminal then determines if the band of the $n^{th}$ LAB channel is Forbidden (block 276). If it is, the Forbidden table in the wireless terminal is updated to mark the band as Forbidden (block 278).

After the H/P, F/N or Forbidden lists have been updated (blocks 270, 274, 278, respectively) (if necessary) the counter n is incremented by one (block 280). If n is less than or equal to N (block 282), where N is the number of channels in the LAB band which are listed in the DHT table, the process continues as described above at block 262. If n exceeds N (block 282), then all of the channels listed in the DHT table that are in the LAB band have been scanned without identification of an acceptable control channel, and the LAB portion of the DHT scan is concluded (block 254).

FIG. 8 illustrates an embodiment of the IRDB portion of the DHT scan according to the teachings of the present invention. As noted above, this portion of the DHT scan is performed if an acceptable control channel is not identified in the POF scan or the H/P or LAB portions of the DHT scan. As shown in FIG. 8, the first step in the IRDB portion of the DHT scan is to set a counter "x" equal to one (block 292). This counter is used to keep track of the bands identified in the IRDB data base (which is typically all eight frequency bands). The wireless terminal then determines whether or not band x (in this case the first band listed in the IRDB data base) is marked Forbidden by reference to the Forbidden band list that is stored at the wireless terminal (block 294). If it is not marked as Forbidden, the wireless terminal determines whether or not frequency band x was already scanned during an earlier portion of the DHT scan (block 296). If it was, or if at block 294 it was determined that band x was marked Forbidden, the counter x is incremented by one (block 298). The counter "x" is then compared to a number "X" (block 300), which represents the number of frequency bands identified in the IRDB data base. If x is less than or equal to X, additional bands remain to be scanned during the IRDB portion of the DHT scan, and the process continues as described above (and below) at block 294. If instead, x exceeds X, then all of the bands in the IRDB order have been scanned, and the DHT scan is completed (block 302).

If at block 296 the wireless terminal determines that band x was not already scanned in the H/P or LAB portions of the DHT scan, the counter n is set to one (block 304). The wireless terminal then attempts to acquire synchronization with the $n^{th}$ channel (in this case the first) included in the DHT table that is in frequency band x (block 306). The wireless terminal determines whether or not this channel is on a frequency band operated by a Home or Partner service provider (block 308). If the channel is on a frequency band operated by a Home or Partner service provider, the wireless terminal determines whether (a) the channel is a public control channel and (b) whether or not the signal being transmitted over the channel has the minimum specified signal strength (block 310). If these selection criteria are satisfied, the wireless terminal enters the DCCH camping state on the control channel (block 312). If the wireless terminal determines that the channel is not a public control channel or that the strength of signal received over the channel is below the minimum specified level (block 310), the wireless terminal does not attempt to camp on the channel. However, at this point the wireless terminal again acts to obtain information regarding frequency band x for use in later stages of the IR search. In particular, since the wireless terminal now knows that frequency band x is operated by either a Home or Partner service provider, the frequency band and channel are added to the H/P list (block 314).

Similarly, if at block 308 the wireless terminal determines that frequency band x is not operated by either a Home or Partner service provider, the wireless terminal then determines whether or not the band is operated by a Favored or Neutral service provider (block 316). If it is, the band and channel number of the no channel in the frequency band x are added to F/N List (block 318). If at block 316 it is determined that the $n^{th}$ channel on frequency band x is not operated by a Favored or Neutral service provider, the wireless terminal determines if the frequency band is a Forbidden band (block 320). If it is, the Forbidden table in the wireless terminal is updated to mark the band as Forbidden (block 322).

After the H/P, F/N or Forbidden lists have been updated (blocks 314, 318, 322, respectively), if necessary, the counter n is incremented by one (block 324). If n is less than or equal to N (block 326), where N is the number of channels in frequency band x which are listed in the DHT table, the process continues as described above at block 306. If n exceeds N (block 326), then all of the channels listed in the DHT table that are in frequency band x have been scanned without identification of an acceptable control channel. At this point the process continues at block 298 as described above, where x is incremented by one and the same process is repeated for the next frequency band in the IRDB database band order.

As shown in FIG. 4, if an acceptable control channel is not identified during the DHT scan (blocks 148, 150), the IR search process continues with a wideband scan (block 152). Pursuant to the teachings of the present invention, it will be understood that information learned during either or both of the POF and DHT scans may be fed forward to more efficiently choose the order in which channels and bands are scanned during the wideband scan. In particular, in certain embodiments of the present invention, channels in frequency bands that have been identified as operated by Home or Partner service providers are scanned first, and channels and frequency bands which have been identified as Favored, Neutral or Forbidden may be skipped entirely during the wideband scan. After the identified Home and Partner service provider bands have been scanned (the "H/P portion" of the wideband scan), the wideband scan continues by scanning control channels in the LAB frequency band (if any). This portion of the wideband scan (the "LAB portion") is not done, however, if the LAB band was identified as a Home, Partner, Favored, Neutral or Forbidden service provider frequency band during the POF or DHT scans. Finally, the wideband scan is concluded by scanning any remaining frequency bands in the IRDB order which were not scanned during the H/P or LAB portions of the wideband scan, and which were not previously identified as Favored, Neutral or Forbidden bands (the "IRDB portion" of the wideband scan).

Figure 9:
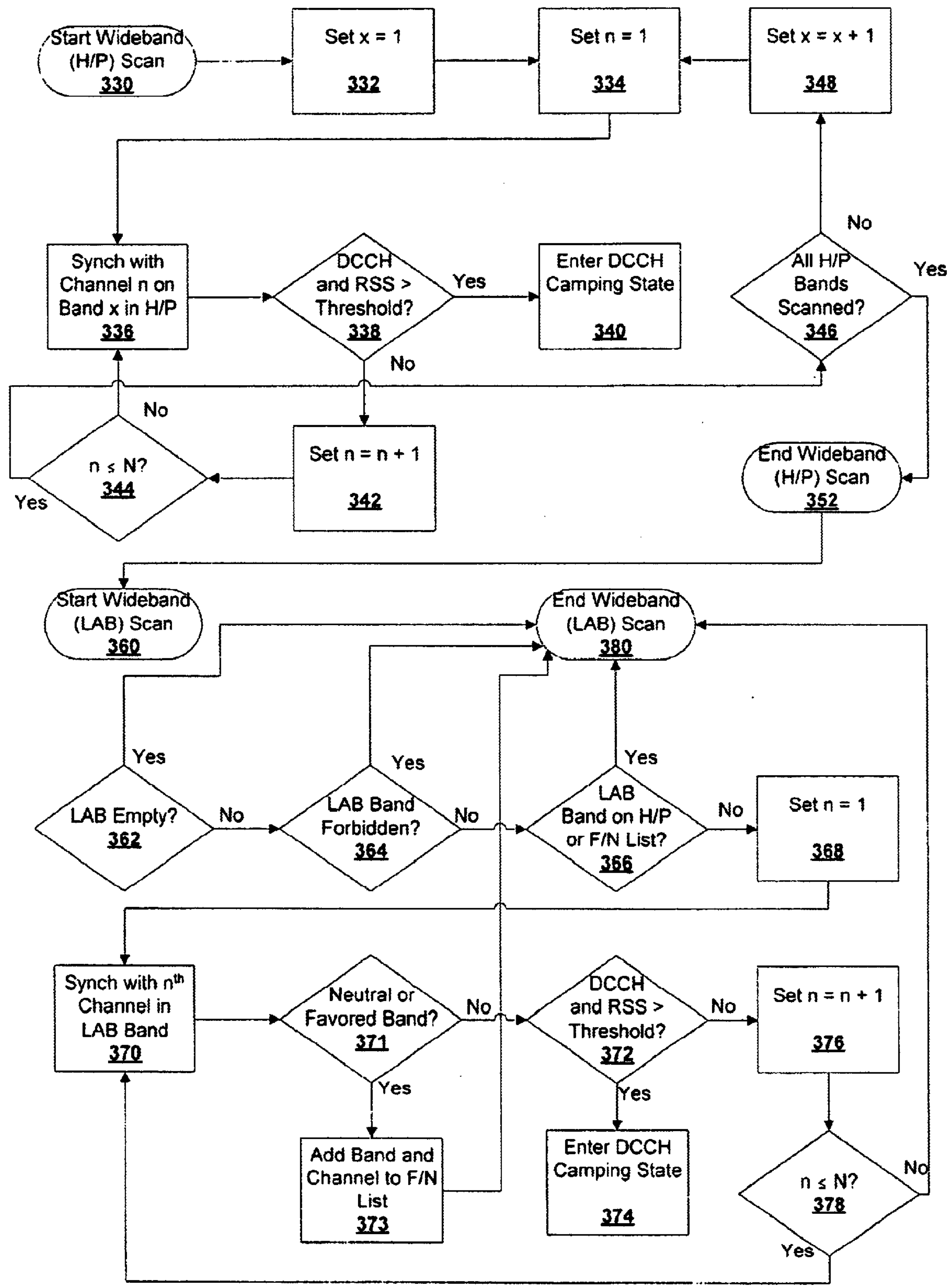
FIG. 9 is a flow chart illustrating operations for performing a portion of blocks 152 and 154 of FIG. 4 according to embodiments of the present invention.
Figure 10:
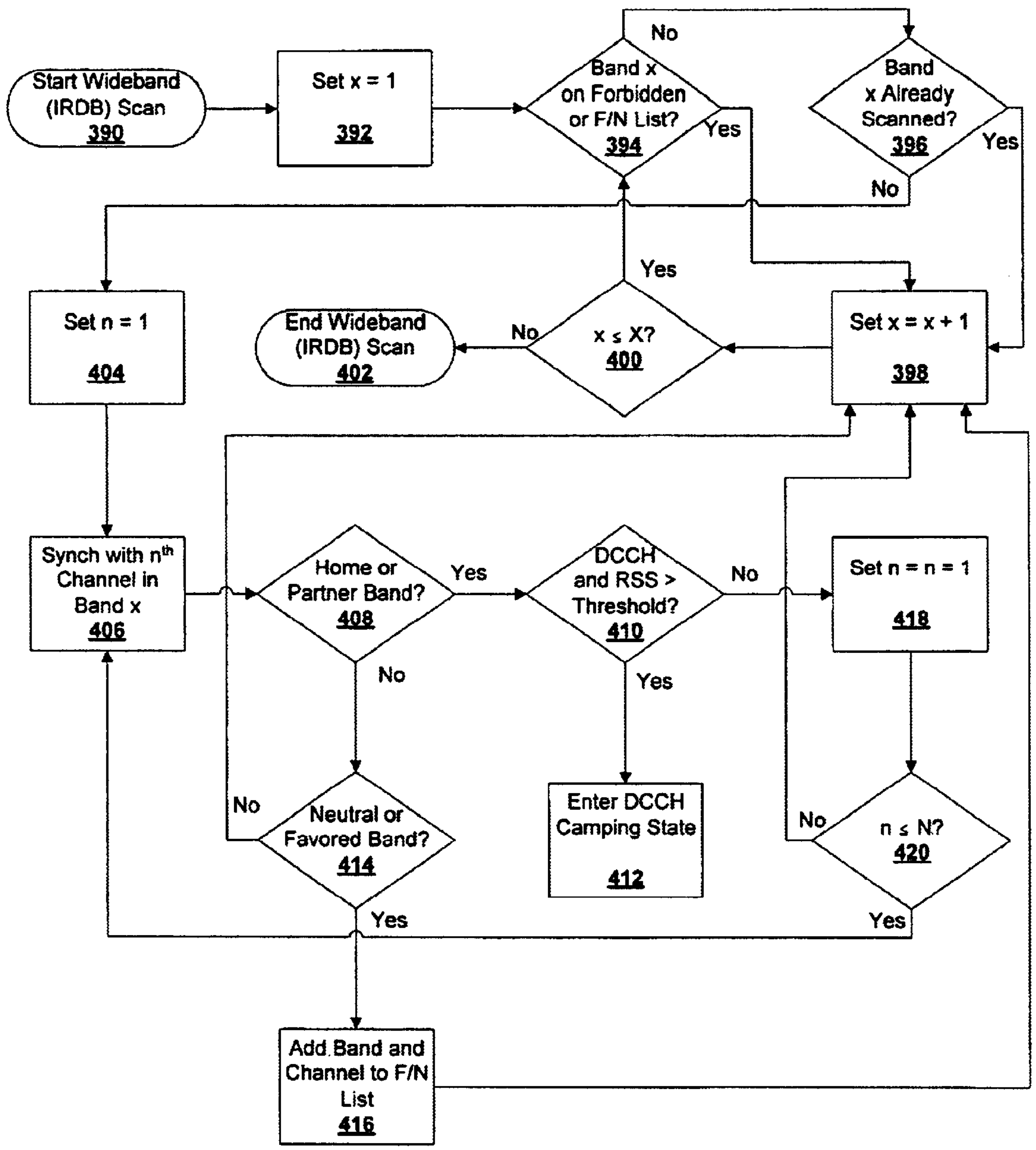
FIG. 10 is a flow chart illustrating operations for performing the remaining portion of blocks 152 and 154 of FIG. 4 according to embodiments of the present invention.

FIGS. 9–10 provide further detail regarding how the wideband scan of block 152 of FIG. 4 may be implemented according to embodiments of the present invention. As shown in FIG. 9, the wideband scan starts (block 330) by setting a counter "x" to one (block 332). The counter "x" is used to keep track of the frequency bands which were identified as Home or Partner frequency bands during the POF and/or DHT scans. Next, a second counter n is set to one (block 334). The counter "n" is used to keep track of the channels in each frequency band operated by a Home or Partner service provider that are to be scanned during the H/P portion of the wideband scan.

After the "x" and "n" counters are set to one, the wireless terminal attempts to acquire synchronization with the $n^{th}$ channel (in this case the first) that is to be examined in the $x^{th}$ frequency band (in this case the first) that was identified as a Home or Partner service provider frequency band during the POF or DHT scans (block 336). After acquiring synchronization, the wireless terminal determines whether (a) the channel is a public control channel and (b) whether or not the signal being transmitted over the channel has the minimum specified signal strength (block 338). If these selection criteria are satisfied, the wireless terminal enters the DCCH camping state on the control channel (block 340).

If the wireless terminal determines that the channel is not a control channel or that the strength of signal received over the channel is below the minimum specified level (block 338), the wireless terminal does not attempt to camp on the channel and instead increments the counter "n" by one (block 342). The wireless terminal then compares "n" to a number "N" (block 344), where "N" represents the number of channels in the $x^{th}$ frequency band which are to be examined during the H/P portion of the wideband scan. If "n" is less than or equal to "N", the process continues as described above through blocks 336, 338, 340, 342, 344 for the next channel "n" that is to be examined in frequency band x. If not, the wireless terminal determines whether or not every frequency band that was identified as a Home or Partner service provider frequency band during the POF and/or DHT scans has been scanned in the H/P portion of the wideband scan (block 346). If one or more frequency bands remain to be scanned, "x" is incremented by one (block 348), "n" is set to one (block 334), and the process continues for the first channel in the next frequency band at block 336. If at block 346 all the identified Home and Partner service provider frequency bands have been scanned, the H/P portion of the wideband scan is completed (block 352).

If the H/P portion of the wideband scan is completed without locating an acceptable control channel, the wireless terminal proceeds to perform the LAB portion of the wideband scan. As shown in FIG. 9, the first step in the LAB portion of the wideband scan is to determine whether or not there is an entry in the LAB table stored in the memory of the wireless terminal (block 362). If it is empty, then the LAB portion of the wideband scan is concluded (block 380) as the wireless terminal does not know which band was the last available acceptable band on which it had camped. If the LAB table includes an entry, the wireless terminal determines whether or not the LAB band is marked Forbidden by reference to the Forbidden band list (block 364). If the frequency band that was the LAB band is marked Forbidden, the LAB portion of the wideband scan is completed (block 380).

If the LAB band is not Forbidden (block 364), the wireless terminal next determines if the LAB band is listed on either the H/P or F/N Lists (block 366). If the LAB band is listed on either of these lists, then the LAB portion of the wideband scan is concluded (block 380). The determination at block 366 is conducted because if the LAB band is on the H/P list, this band was already scanned during the H/P portion of the wideband scan, and hence it may be inefficient to re-scan the same band. Similarly, if the LAB band is listed on the F/N list, it by definition cannot contain a control channel that will satisfy the selection criteria in place during the wideband scan, since a control channel is only selected during the wideband scan if it, among other things, is on a Home or Partner service provider frequency band.

If the LAB band is not on the H/P or F/N Lists (block 366), then a counter "n" is set to one (block 368). This counter "n" is used to track the channels in the LAB band which are to be scanned during the LAB portion of the wideband scan. After the counter is set to one, the wireless terminal attempts to acquire synchronization with the $n^{th}$ channel (in this case the first) in the LAB frequency band that is to be scanned during the wideband scan (block 370). The wireless terminal then determines whether or not the service provider that operates the band is a Favored or Neutral service provider (block 371). If so, the band and channel are added to the F/N List (block 373) and the LAB portion of the wideband scan is completed (block 380). If not, the wireless terminal determines whether or not (a) the channel is a public control channel and (b) whether the signal being transmitted over the channel has the minimum specified signal strength (block 372). If these selection criteria are satisfied, the wireless terminal enters the DCCH camping state on the control channel (block 374). If the wireless terminal determines that the channel is not a public control channel or that the strength of signal received over the channel is below the minimum specified level (block 372), the counter n is incremented by one (block 376). If n is less than or equal to N (block 378), where N is the number of channels in the LAB band which are to be scanned in the wideband scan, the process continues as described above at block 370. If n exceeds N (block 378), then the LAB portion of the wideband scan is concluded (block 380).

After the LAB portion of the wideband is concluded, the search for an acceptable control channel continues, if necessary, with the IRDB portion of the wideband scan. One embodiment of this portion of the wideband scan is depicted in FIG. 10. As shown in FIG. 10, the first step in the IRDB portion of the wideband scan is set a counter "x" equal to one (block 392). This counter is used to keep track of the bands identified in the IRDB data base. The wireless terminal determines whether or not band x (in this case the first band listed in the IRDB data base) is marked Forbidden or is on the F/N List (block 394). If it is not marked as Forbidden or listed in the F/N List, the wireless terminal determines whether or not frequency band x was already scanned during an earlier portion of the wideband scan (block 396). If it was, or if at block 394 it was determined that the band was marked Forbidden or was on the F/N List, the counter x is incremented by one (block 398). The counter "x" is then compared to a number "X" (block 400) which represents the number of frequency bands identified in the IRDB data base. If x is less than or equal to X, then additional bands remain to be examined/scanned during the IRDB portion of the wideband scan, and the process continues as described above (and below) at block 394. If instead, x exceeds X, then all of the bands in the IRDB order have been scanned, and the wideband scan is completed (block 402).

If at block 396 the wireless terminal determines that band x was not already scanned in the H/P or LAB portions of the wideband scan, the counter n is set to one (block 404). The wireless terminal attempts to acquire synchronization with the $n^{th}$ channel (in this case the first) that is to be scanned in frequency band x (block 406). The wireless terminal determines whether or not this channel is on a frequency band operated by a Home or Partner service provider (block 408). If the channel is on a frequency band operated by a Home or Partner service provider, the wireless terminal determines whether (a) the channel is a public control channel and (b) whether or not the signal being transmitted over the channel has the minimum specified signal strength (block 410). If these selection criteria are satisfied, the wireless terminal enters the DCCH camping state on the control channel (block 412).

If at block 408 the wireless terminal determines that frequency band x is not operated by either a Home or Partner service provider, the wireless terminal determines whether or not the band is operated by a Favored or Neutral service provider (block 414). If it is, the band and channel number of the $n^{th}$ channel in the frequency band x are added to F/N List (block 416). At this point the process continues at block 398 as described above, where x is incremented by one and the same process is repeated for the next frequency band in the IRDB database band order. Similarly, if at block 414 it is determined that frequency band x is not operated by a Favored or Neutral service provider, the process also continues at block 398 as described above, where x is incremented by one and the same process is repeated for the next frequency band in the IRDB database band order.

If at block 410 the wireless terminal determines that the channel is not a public control channel or that the strength of signal received over the channel is below the minimum specified level, the counter n is incremented by one (block 418). If n is less than or equal to N (block 420), where N is the number of channels in frequency band x which are to be scanned during the wideband scan, the process continues as described above at block 406. If n exceeds N (block 420), then all of the channels in frequency band x which are to be scanned have been scanned without identification of an acceptable control channel. At this point the process continues at block 398 as described above, where x is incremented by one and the same process is repeated for the next frequency band in the IRDB database band order.

As discussed above with respect to the DHT scan, it will be understood by those of skill in the art that in the embodiment of FIGS. 9–10 typically not all of the channels within a particular frequency band will be scanned. The reason for this is that by only scanning a subset of the channels that have relatively high received signal strengths, it is possible to greatly reduce the time required to conduct the wideband scan without greatly reducing the probability of locating an acceptable control channel. Thus, in certain embodiments of the present invention, each of the frequency bands that are scanned during the wideband scan are divided into sub-bands or probability blocks. The received signal strength of the channels in each such frequency band are examined, and the two channels in each sub-band or probability block having the highest received signal strength are selected for scanning. By selecting the sub-bands or probability blocks so that the control channels will tend to be grouped within a single sub-band or probability block, it is possible to ensure that the two best potential control channels from each frequency band are scanned during the wideband scan, while only examining a fraction of the channels in these frequency bands.

Figure 11:
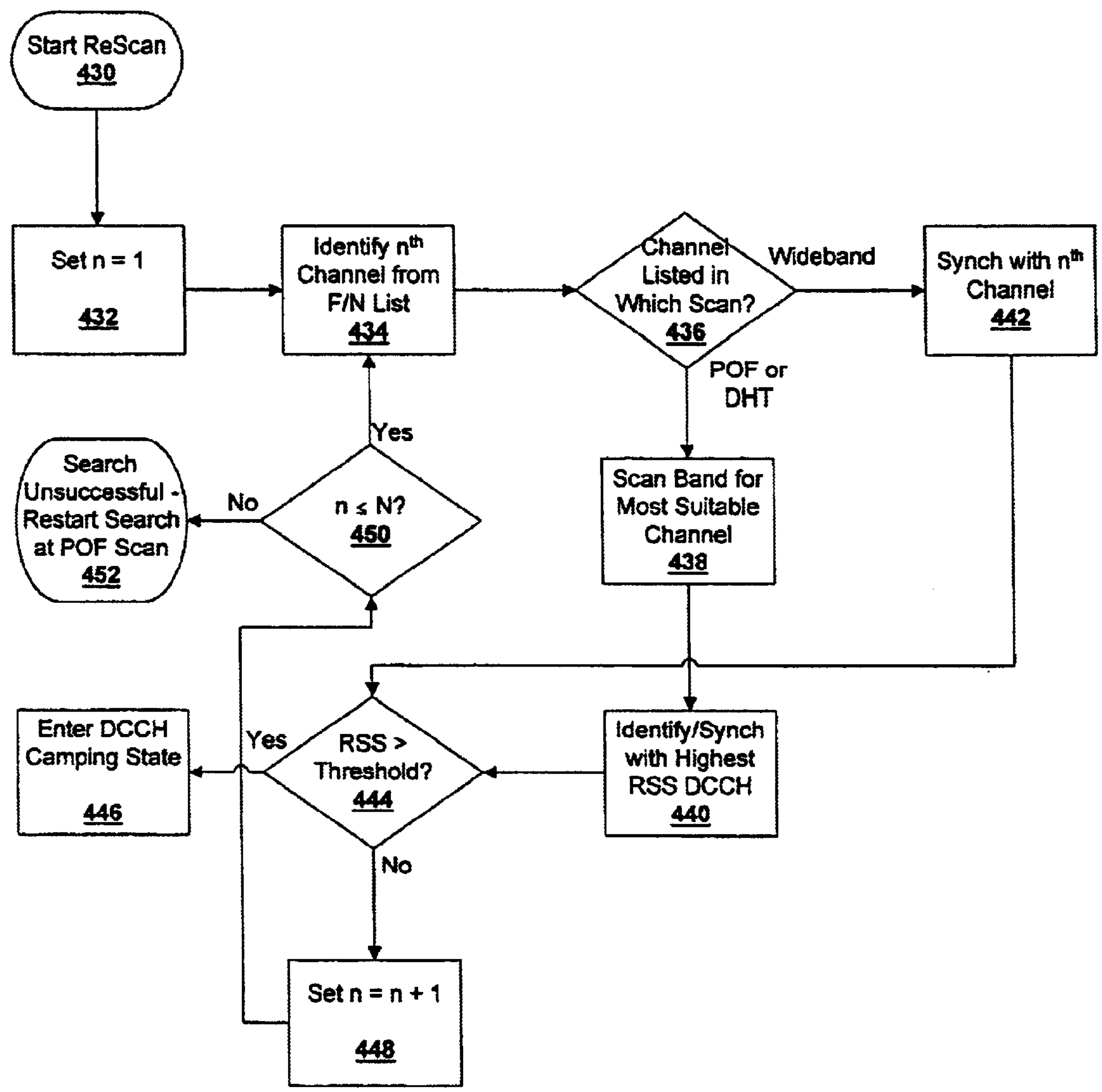
FIG. 11 is a flow chart illustrating operations for performing blocks 156 and 158 of FIG. 4 according to embodiments of the present invention.

As shown in FIG. 4, if the wideband scan fails to identify an acceptable control channel, then the IR search proceeds to the re-scan procedure, which is the fourth and final stage of the search. FIG. 11 illustrates one embodiment of the rescan procedure according to the teachings of the present invention. As shown in FIG. 11, at the beginning of the re-scan procedure, a counter "n" is set to one (block 432). Then, the $n^{th}$ entry on the FIN List is identified (block 434). The wireless terminal may then determine whether the $n^{th}$ entry in the F/N List was added during the POF or DHT scans versus the wideband scan (block 436).

If the $n^{th}$ entry in the F/N List was added during either the POF or DHT scans, a full band scan is performed (block 438). Typically this will be performed by dividing the band into sub-bands or probability blocks and acquiring synchronization with the two highest receive signal strength channels in each sub-band as described earlier with respect to the wideband scan to identify the control channel on the band having the highest receive signal strength (block 440). The received signal strength of this channel is compared to the minimum allowable threshold (block 444). If it exceeds, the threshold, the wireless terminal enters into the DCCH camping state on this channel (block 446). If not, n is incremented by one (block 448), and compared to a number "N" where N is the number of entries in the F/N List (block 450). If n is less than or equal to N, at least one entry remains to be examined in the F/N List and the process continues as described above at block 434. If n exceeds N, the IR search has been completed without locating an acceptable control channel (block 452).

If at block 436 the $n^{th}$ channel was added to the F/N List during the wideband scan, the wireless terminal proceeds to synch with the $n^{th}$ channel without first performing a wideband scan (block 442). At this point, the process continues at block 444 as described above.

During the re-scan procedure, it is beneficial to examine the stage of the IR search during which a band-channel pair was added to the F/N List because of the differences in the searches performed at each stage. In particular, as will be understood by those of skill in the art, information regarding the type of service provider (i.e., Home, Partner, Favored, Neutral or Forbidden) may only be available on a control channel. Consequently, during the wideband scan, a band will only be identified as a band operated by a Favored or Neutral service provider after the terminal has identified the sub-band or probability block that contains the control channels and scanned the channel in that sub-band/block having the highest receive signal strength. Accordingly, when channels/bands were added to the F/N List during the wideband scan, it is not necessary to scan the entire band, but instead may be sufficient to simply scan the channels listed for each such band on the F/N List, since the wireless terminal has typically already identified the "best" channels. However, when a band-channel pair is added to the F/N List during the POF or DHT scans typically only a single individual channel will have been examined, and, hence, the channel added to the list may not be the best control channel in the frequency band. Consequently, a scan of the entire frequency band may be performed during the rescan procedure for frequency bands which were added to the F/N List during the POF or DHT scans.

It will be appreciated by those of skill in the art that depending on the architecture of the wireless system and the characteristics of the wireless terminal, more or less than four scans may be performed during an IR search. For instance, in a TIA/EIA-136 system, the wireless terminal may not have any private operating frequencies listed in memory. In such a case, the POF scan shown in FIGS. 4–5 is not required and preferably is not performed. Likewise, a wireless terminal may not store information regarding its control channel history in a DHT table. This likewise would eliminate the need for the DHT scan depicted in FIGS. 6–8 herein.

In the description of the flow chart illustrations above, various counters are referenced. It will be understood by those of skill in the art that actual counters are not needed in the implementation of the invention, but that they facilitate providing flow diagrams which describe the processes followed in various embodiments of the present invention.

The flowcharts of FIGS. 3 through 11 illustrate the architecture, functionality, and operation of possible implementations of methods and systems according to the present invention. In this regard, each block in the flow charts represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

As noted above, various lists and databases may be maintained at the wireless terminal such as, for example, the H/P List, the F/N List and the IRDB database. It will be understood by those of skill in the art that these lists and databases may be maintained as multiple lists, databases, tables or the like, or, alternatively, may be maintained as a single list, database or table. Generally, these lists and databases are provided so as to be updateable, such that they may be modified to include new information or to change the information stored therein.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for a wireless terminal to select a control channel from a plurality of channels provided on a plurality of respective operating frequencies, the method comprising:

scanning a first subset of the operating frequencies to locate a control channel that satisfies a first set of selection criteria;

identifying channels during the scan of the first subset of the operating frequencies that fail to satisfy the first set of selection criteria and that have an increased probability of satisfying a second set of selection criteria;

selecting a control channel from those control channels that satisfy the first set of selection criteria if such a control channel is located during the scan of the first subset of the operating frequencies;

determining an order in which a second subset of the operating frequencies are to be scanned based on the identified channels;

scanning the second subset of the operating frequencies in the determined order to locate a control channel that satisfies the second set of selection criteria; and selecting a control channel that satisfies the second set of selection criteria.

2. The method of claim 1, wherein the plurality of channels are grouped into a plurality of frequency bands such that each frequency band includes multiple channels.

3. The method of claim 2, wherein a channel is identified as having an increased probability of satisfying the second set of selection criteria if it is operated by a home or a partner service provider.

4. The method of claim 3, further comprising identifying channels that operate on a forbidden band during the scan of the first subset of the operating frequencies.

5. The method of claim 4, wherein the step of scanning the second subset of the operating frequencies comprises scanning operating frequencies in bands other than bands identified as forbidden.

6. The method of claim 2, wherein the first subset of the operating frequencies comprises operating frequencies that correspond to private channels.

7. The method of claim 6, wherein a private control channel having a received signal strength exceeding a first threshold satisfies the first set of selection criteria.

8. The method of claim 6, wherein the second subset of the operating frequencies comprises operating frequencies corresponding to control channels on which the terminal has previously camped.

9. The method of claim 8, wherein control channels operated by home or partner service providers having received signal strengths exceeding a second threshold satisfy the second set of selection criteria.

10. The method of claim 8, wherein a channel is identified as having an increased probability of satisfying the second set of selection criteria if it is operated by a home or a partner service provider and, wherein during the scan of the second subset of the operating frequencies the frequency bands that include channels identified as having an increased probability of satisfying the second set of selection criteria are scanned first.

11. The method of claim 10, wherein during the scan of the second subset of the operating frequencies, channels in the frequency band on which the terminal last camped are scanned immediately after the scan of the frequency bands that include channels identified as having an increased probability of satisfying the second set of selection criteria.

12. The method of claim 8, wherein the method further comprises scanning a third subset of the operating frequencies for a control channel that satisfies the second set of selection criteria.

13. The method of claim 12, wherein the third subset of the operating frequencies includes operating frequencies in each of the plurality of frequency bands.

14. The method of claim 13, wherein a channel is identified as having an increased probability of satisfying the second set of selection criteria if it is operated by a home or a partner service provider and, wherein during the scan of the third subset of the operating frequencies the frequency bands that include channels identified as having an increased probability of satisfying the second set of selection criteria are scanned first.

15. The method of claim 1, further comprising the step of identifying channels operated by a favored or a neutral service provider during the scan of the first subset of the operating frequencies.

16. The method of claim 1, wherein determining the order in which the second subset of the operating frequencies are to be scanned based on the identified channels comprises ordering the second subset of the operating frequencies so that operating frequencies in the frequency bands that include channels identified as having an increased probability of satisfying the second set of selection criteria are included at the beginning of the order.

17. A method for a wireless terminal to scan a plurality of public and private channels provided on a plurality of respective operating frequencies that are grouped into a plurality of frequency bands such that each frequency band includes multiple channels, the method comprising:

scanning the operating frequencies that correspond to a subset of the private control channels;

identifying frequency bands that are operated by a home or a partner service provider during the scan of the operating frequencies that correspond to the subset of the private control channels; and then scanning the operating frequencies that correspond to public control channels on which the terminal has previously camped that are in frequency bands identified as being operated by the home or partner service providers; and then scanning the operating frequencies that correspond to public control channels on which the terminal has previously camped that are in frequency bands other than those identified as being operated by home or partner service providers; and then scanning the operating frequencies having the highest received signal strength values in a plurality of the frequency bands.

18. The method of claim 17, further comprising identifying forbidden frequency bands during the scan of the operating frequencies that correspond to the subset of private control channels.

19. The method of claim 18, wherein during the scans of operating frequencies that correspond to public control channels only operating frequencies in frequency bands other than frequency bands identified as forbidden are scanned.

20. The method of claim 17, further comprising the step of identifying frequency bands operated by a favored or a neutral service provider during the scan of the operating frequencies that correspond to the subset of private control channels.

21. The method of claim 20, further comprising the step of identifying frequency bands operated by favored or neutral service providers during the scans of the operating frequencies that correspond to public control channels on which the terminal has previously camped.

22. The method of claim 21, wherein during the scan of the operating frequencies having the highest received signal strength values operating frequencies in frequency bands identified as being operated by favored or neutral service providers are omitted from the scan.

23. A system for selecting a control channel from a plurality of channels provided on a plurality of respective operating frequencies, comprising:

means for scanning a first subset of the operating frequencies to locate a control channel that satisfies a first set of selection criteria;

means for identifying channels during the scan of the first subset of the operating frequencies that fail to satisfy the first set of selection criteria and that have an increased probability of satisfying a second set of selection criteria;

means for selecting a control channel from those control channels that satisfy the first set of selection criteria if such a control channel is located during the scan of the first subset of the operating frequencies;

means for determining an order in which a second subset of the operating frequencies are to be scanned based on the identified channels;

means for scanning the second subset of the operating frequencies in the determined order to locate a control channel that satisfies the second set of selection criteria; and means for selecting a control channel that satisfies the second set of selection criteria.

24. The system of claim 23, wherein the plurality of channels are grouped into a plurality of frequency bands such that each frequency band includes multiple channels.

25. The system of claim 24, wherein a channel is identified as having an increased probability of satisfying the second set of selection criteria if it is operated by a home or a partner service provider.

26. A wireless terminal comprising:

a housing;

a transceiver positioned in the housing;

an antenna extending from the housing and coupled to the transceiver;

a user interface operatively coupled to the processor;

a controller positioned in the housing and coupled to the transceiver;

a memory unit positioned in the housing and operatively coupled to the controller;

wherein the memory unit includes a first updateable database of frequency bands identified during a control channel search as being operated by home or partner service providers; and wherein the memory unit further includes a second updateable database of frequency bands identified during a control channel search as being operated by favored or neutral service providers.

27. The wireless terminal of claim 26, further comprising means for selecting an order in which to search operating frequencies for a control channel based on the contents of the first and second databases.

* * * * *